United States Patent [19]

Urbanick

[11] Patent Number: 4,527,807
[45] Date of Patent: Jul. 9, 1985

[54] PANEL EDGE GASKET

[75] Inventor: Burton A. Urbanick, La Grange, Ill.

[73] Assignee: Dallas Corporation, Dallas, Tex.

[21] Appl. No.: 624,464

[22] Filed: Jun. 25, 1984

[51] Int. Cl.³ .......................... E06B 7/22; F16J 15/16
[52] U.S. Cl. .............................. 277/189; 277/206 A; 52/716
[58] Field of Search ............ 277/189, 206 R, 206 A; 52/716

[56] References Cited

U.S. PATENT DOCUMENTS

| 2,635,907 | 4/1953 | Heimbuch | 277/189 |
| 3,363,390 | 1/1968 | Crane et al. | 52/716 |
| 3,518,792 | 7/1970 | Williamson et al. | 49/488 |
| 3,804,217 | 4/1974 | Keuzer et al. | 277/206 R |
| 3,886,686 | 6/1975 | Urbanick | 49/488 |
| 4,119,325 | 10/1978 | Oakley et al. | 277/207 R |
| 4,165,083 | 8/1979 | Dochrahl | 277/206 R |
| 4,214,036 | 7/1980 | Bright | 428/358 |
| 4,243,234 | 6/1981 | Blaha | 277/189 |
| 4,310,164 | 1/1982 | Mesnel | 277/189 |
| 4,370,832 | 2/1983 | Koike | 49/488 |

Primary Examiner—Robert I. Smith
Attorney, Agent, or Firm—Hoiser & Sufrin, Ltd.

[57] ABSTRACT

A panel edge gasket including a rigid elongated member defining a panel edge receiving channel and having flexible fingers attached along opposing inner faces of the panel legs which flex downwardly into the channel and outwardly into relief recesses in the channel legs as a panel edge is moved into the channel.

11 Claims, 8 Drawing Figures

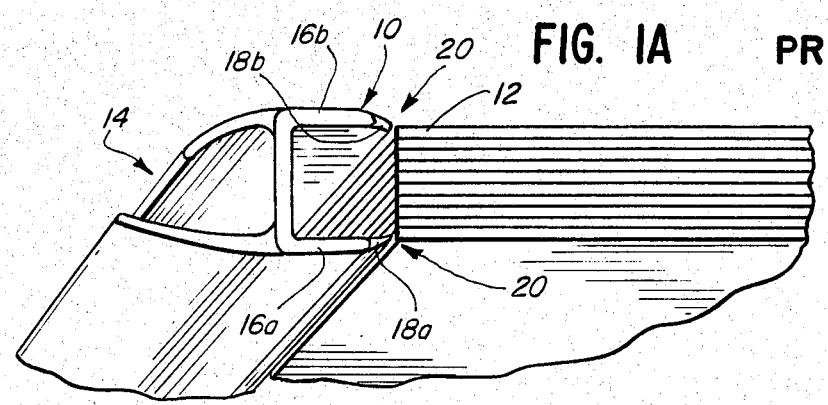
FIG. 1A  PRIOR ART
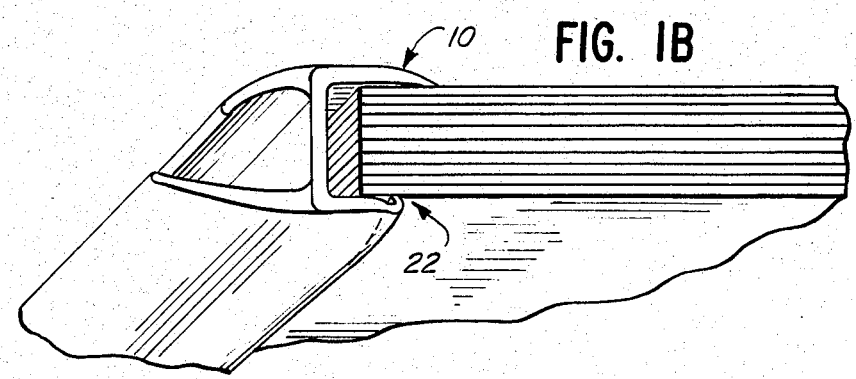
FIG. 1B
FIG. 2A
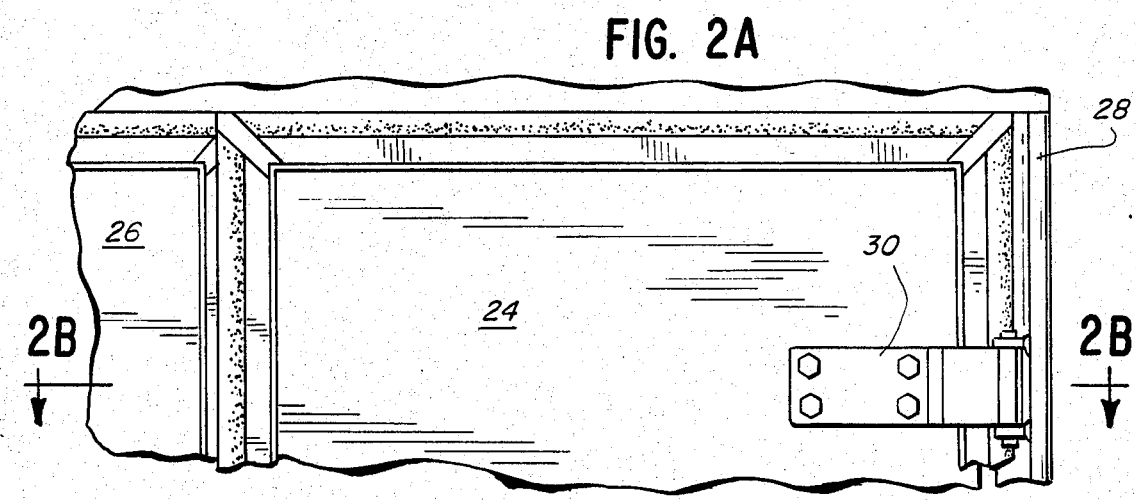
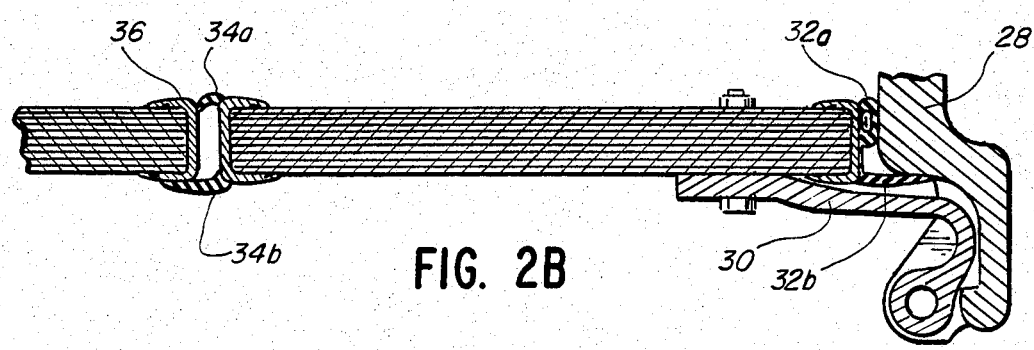
FIG. 2B

PANEL EDGE GASKET

BACKGROUND OF THE INVENTION

This invention relates generally to panel edge gasketing and, more particularly, to improved gaskets which can be applied to panel edges to obtain a hermetic seal about the perimeter of the panel with significantly reduced resistance in the application of the gasket to the panel and significantly enhanced withdrawal resistance and sealing efficiency.

The present invention will find application in a wide range of areas where it is important to obtain airtight and/or weatherproof seals about the perimeter of a panel in order to prevent air and moisture from penetrating from the exposed side of the panel through to the panel edge or past the panel edge through to the protected side of the panel.

U.S. Pat. Nos. 3,518,792 and 3,886,686 to the present inventor, for example, illustrate an important application for panel edge gasketing in door closure seals for container doors in cargo boxes, semi-trailer vans, truck bodies, railway freight cars and the like. These patents describe a resiliently deformable channel 10, as depicted in FIGS. 1A and 1B, adapted to be fit about a panel edge 12 and carrying an opposite dynamic closure gasket generally designated 14 in FIG. 1A. Channel 10 is defined by a pair of upstanding legs 16a and 16b, each of which includes along its distal edges pliable leading tip portions 18a and 18b which are contoured to project inwardly to provide an intimate, resilient engagement with opposed sidewalls of the panel.

Unfortunately, these leading tip portions engage the face of the panel edge, as depicted at 20 in FIG. 1A, interfering with the assembly of the channel to the panel edge. Indeed, the leading tip portions often bend under as the panel is forced into the channel, as generally depicted at 22 in FIG. 1B, requiring the channel to be repeatedly backed off to unfold the leading tip portions. Also, in the course of this repeated folding under and backing off operation, the pliable tips are often deformed, impairing the integrity of the seal which they are intended to provide at the panel sidewalls.

SUMMARY OF THE INVENTION

Accordingly, an important object of the present invention is to provide a rigid, resiliently deformable, elongated member for application to a panel edge, having pliable fingers which wipe the opposing sidewalls of the panel but do not impair assembly of the elongated member to the panel edge.

Another important object of the present invention is to provide a panel edge gasket with pliable fingers to not only seal but also to help retain the gasket on the panel edge.

A further object of the present invention is to provide a panel edge gasket with resiliently deformable legs having pliable fingers for sealing against the opposing sidewalls of the panel in which the fingers move into relief grooves in the legs to eliminate distortion in the channel after assembly to the panel.

A still further object of the present invention is to provide a panel edge gasket with rigid, resiliently deformable legs configured to facilitate assembly of the gasket to a panel edge.

These and other objects of the present invention will become apparent to those skilled in the art upon consideration of the accompanying specification, claims and drawings.

The panel edge gasket of the present invention includes a rigid, resiliently deformable elongated member having a base supporting upstanding, opposed first and second legs which define a panel edge receiving channel. Attached longitudinally along opposing inner faces of the first and second legs are respective first and second pliable fingers for sealing against opposing panel sidewalls adjacent the panel edge. The pliable fingers are adapted to flex downwardly into the channel and outwardly against the inner faces of the channel legs as the panel is moved into the channel. Finally, relief means are undercut in the inner faces of the legs rearwardly of the point of attachment of the fingers, for receiving the downwardly and outwardly flexing fingers as the panel edge is moved into the channel.

In addition, in order to facilitate assembly of the channel to the panel edge, the first leg may be made longer than the second leg and a panel-guiding bevel may be applied along the inner distal edge of the second leg. Finally, assembly may be further facilitated by positioning the first finger on the first leg inner face adjacent the distal end of the leg and positioning the second finger on that inner face of that leg spaced from the distal edge of the leg.

BRIEF DESCRIPTION OF THE DRAWINGS

The features of this invention which are believed to be novel are set forth with particularity in the appended claims. The invention, together with its objects and advantages, may be best understood by reference to the following description, taken in conjunction with the following drawings, in which like reference numerals identify like elements in the several figures and in which:

FIGS. 1A and 1B depict panel edge gasketing of the prior art, as described above;

FIG. 2A is a side elevation view of a portion of a container door assembly constructed in accordance with the teachings of the present invention and FIG. 2B is a fragmentary, cross-sectional view taken along line 2B—2B of FIG. 2A;

DESCRIPTION OF THE PREFERRED EMBODIMENT

Figure 3:
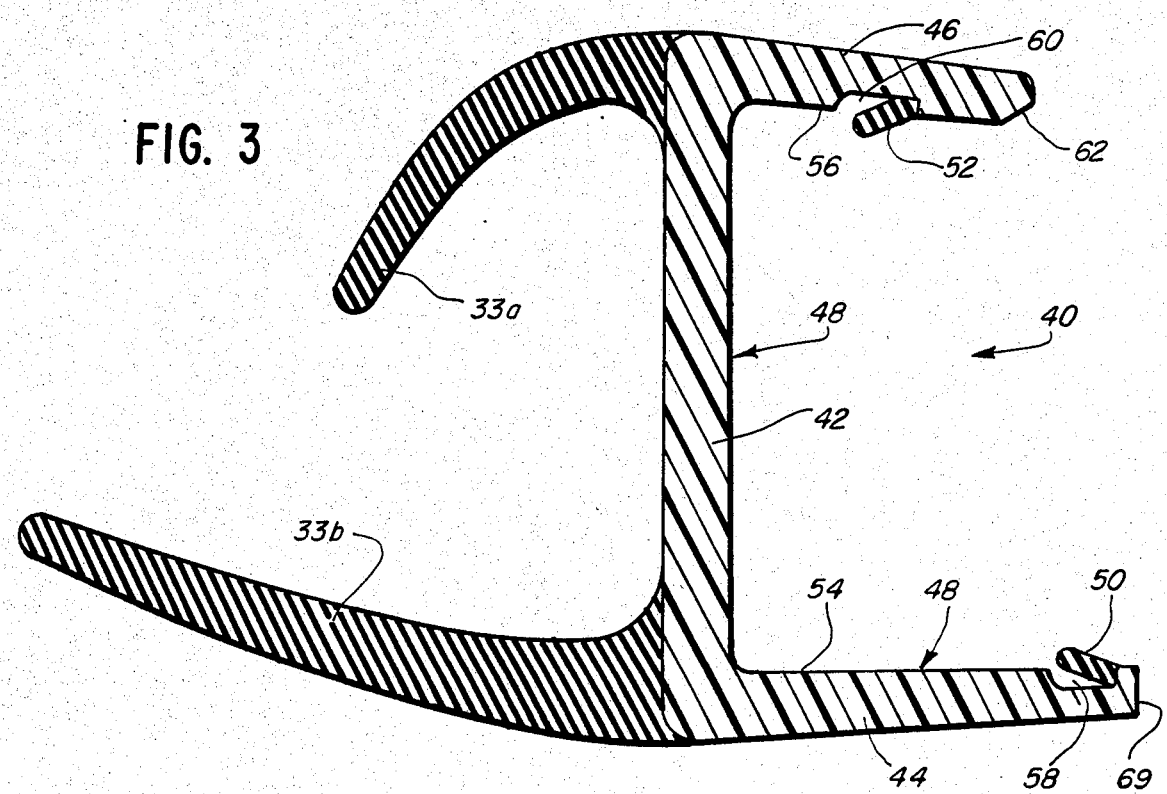
FIG. 3 is an enlarged plan view of the gasket of the present invention.

Turning now to FIG. 2A, there is shown for purposes of illustrating the present invention a portion of a pair of mated swing-out doors 24 and 26 of a semi-trailer truck, although it should be understood that the present invention will be useful in a wide range of gasketing applications.

While door panels 24 and 26 may be composed of any available rigid sheet material, laminated plywood panels with an outer cladding of sheet metal are particularly well accepted in the art. In such panels, it is particularly important to prevent moisture from reaching the panel edge and attacking the bonding of either the cladding or the plywood layers.

Doors 24 and 26 are mounted within outer door frame 28 by hinges 30 which are depicted in both the side elevation view of FIG. 2A and the cross-sectional view of FIG. 2B. Also illustrated in FIG. 2B are alternative dynamic closure seals 32 comprising paired contoured sealing lips 32a and 32b and 34a and 34b which respectively engage flat face portions and transverse edge portions of the adjacent door panel and the door frame in the closed pair of doors. Although these dynamic closure seals are shown for purposes of illustrating the present invention, it should be understood that other closure seal configurations could be utilized with the present panel edge gasket and indeed, that the present panel edge gasket could be used without a dynamic closure seal as at 36 in FIG. 2B and in diverse alternative applications.

In the enlarged plan view of FIG. 3, the panel edge gasket of the present invention is shown with resiliently deformable elongated member 40 having a base 42 supporting upstanding, opposed legs 44 and 46. Legs 44 and 46 are preferably spaced only slightly farther apart at base 42 than the panel to which they are to be applied and angled slightly inwardly to grip the panel edge. Elongated member 40 is preferably made from a rigid, resiliently deformable plastic-like material. In a preferred embodiment, it is made from a rigid polyvinyl chloride of approximately 78 Shore D Durometer. Also, it is preferred that a layer of mastic or other adhesive be applied to the interior of the channel at 48 so that it will spread along the channel as it is fitted to the panel edge to secure the channel in place. Naturally, alternative means for fastening the channel to the panel door could be used.

Flexible fingers 50 and 52, which are tapered in thickness, are attached longitudinally along opposed inner faces 54 and 56 of legs 44 and 46. Fingers 50 and 52 are made of a pliable plastic material such as a flexible polyvinyl chloride on the order of 68 Shore A Durometer so that they will form an intimate resilient seal with the opposed sidewalls of the panel, as described in further detail below. The combination of the rigid elongated member 40 with the more flexible fingers 50 and 52 may be co-extruded utilizing techniques well recognized in the applicable art.

Flexible fingers 50 and 52 are preferably oriented downwardly and inwardly as depicted in FIG. 3 so that they will readily flex toward base 42 of the channel and against inner faces 54 and 56 of the legs as a panel edge is moved into the channel. Although the fingers are flexible and do not significantly resist panel insertion, because they are oriented in this way they resist removal of the panel edge from the channel after assembly.

Relief means, in the form of recesses 58 and 60 are formed in the faces 54 and 56 for the fingers. These recesses receive fingers 50 and 52 as the panel is inserted into the channel thereby: (a) further reducing assembly resistance, (b) eliminating shear stress in the fingers to prevent them from tearing away from the leg inner faces, and (c) preventing undesirable distortion in the channel legs.

In order to facilitate assembly of the channel to the panel edge, leg 46 is shortened relative to leg 44 and a bevel 62 is cut along the inner distal edge of leg 46. Thus, the leading portion of longer leg 44 rests against one panel sidewall to help stabilize the channel as the opposing corner 68 of the panel is guided into the channel by bevel 62 (FIG. 4A).

Finger 50 is attached to leg 44 adjacent distal edge 64 of the leg, while finger 52 of leg 46 is spaced from the distal edge 64 of its leg. This offset in the positioning of finger 52 further significantly facilitates assembly since it permits the panel edge to pass bevel 62 as well as the leading portion 70 of leg 44 before engaging finger 52.

Figure 4A:
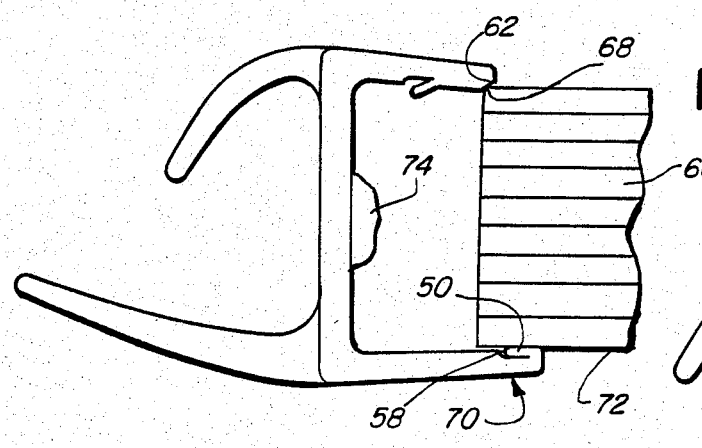
FIGS. 4A—4C are enlarged plan views showing assembly of the gasket of FIG. 3 to a panel edge.
Figure 4B:
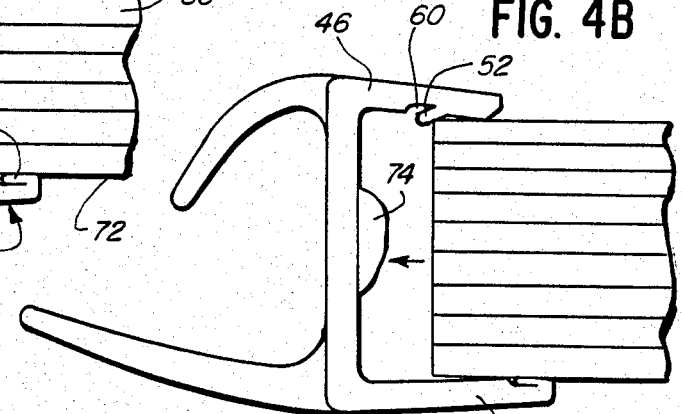
Figure 4C:
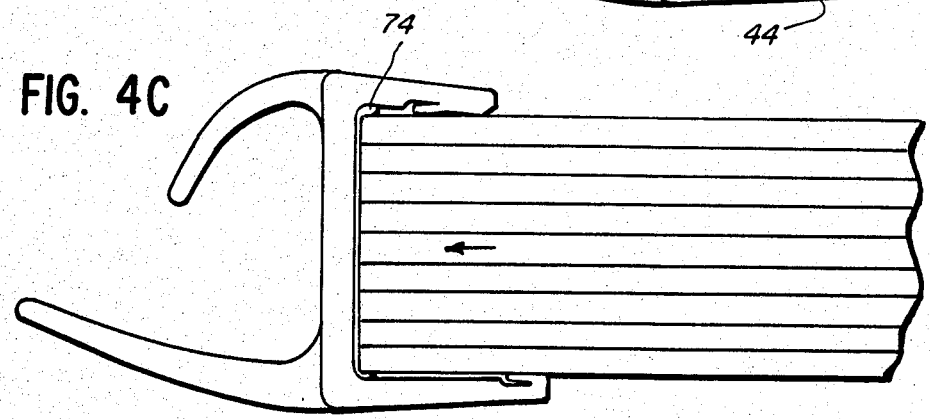

The present panel edge gasket may be assembled to the peripheral edge 66 of panel 24 as illustrated in FIGS. 4A–C. Beginning in FIG. 4A, mastic is applied to the channel at 74, and the panel edge gasket is moved into position adjacent the edge of the panel with the leading portion 70 of leg 44 against sidewall 72 of the panel, finger 50 pressed into recess 58 and opposing panel corner 68 resting against bevel 62 of leg 46. Panel edge 66 is then moved into the channel, as legs 44 and 46 spread slightly and the panel edge first encounters finger 52 (FIG. 4B) which moves into recess 60. As the panel is moved into place, fingers 50 and 52 wipe along the panel edge 50 until the panel comes to rest in the channel, with its leading face potted in mastic 74 (FIG. 4C). In order to seal the entire perimeter of panel 24, gaskets will be applied along each of its four edges with bevels at the intersecting gasket ends at each of the four panel corners.

It should be understood that the present invention may be embodied in other specific forms without the departing from the spirit or central characteristics thereof. The present embodiments are to be considered as being illustrative and not as being restrictive, and the invention is not to be limited to the details herein, but may be modified within the scope of the appended claims.

What is claimed is:

1. A gasket for sealing and retaining a panel edge comprising:

a rigid, resiliently deformable elongated member having a base supporting upstanding, opposed first and second legs defining a panel edge receiving channel;

first and second flexible fingers for sealing against opposing panel sidewalls adjacent the panel edge and for resisting removal of the channel from the panel, said first and second flexible fingers being respectively attached longitudinally along opposing inner faces of said first and second legs, said fingers further being adapted to flex downwardly into said channel and outwardly against said inner faces of said legs as the panel edge is moved into said channel; and relief means, undercut in said leg inner faces rearwardly of the point of attachment of said fingers, for receiving said downwardly and outwardly flexing fingers as the panel edge is moved into said channel.

2. The gasket of claim 1 wherein said first leg is longer than said second leg.

3. The gasket of claim 2 wherein said second leg has a bevel along its inner distal edge.

4. The gasket as in claims 1, 2 or 3 wherein said first finger is attached to said first leg inner face adjacent the distal edge of said first leg and said second finger is attached to said second leg inner face spaced from the distal edge of said second leg.

5. The gasket of claim 1 in which said elongated member is made from a polyvinyl chloride of approximately 78 Shore D Durometer and said fingers are made of flexible polyvinyl chloride of approximately 68 Shore A Durometer.

6. The gasket of claim 1 wherein said fingers are tapered in thickness.

7. A panel edge sealing gasket structure comprising:

a rigid, resiliently deformable elongated member having a base supporting upstanding, opposed first and second legs defining a panel edge receiving channel;

first and second flexible fingers for sealing against opposing panel sidewalls adjacent the panel edge and for resisting removal of the channel from the panel, said first and second flexible fingers being respectively attached longitudinally along opposing inner faces of said first and second legs, said fingers further being adapted to flex downwardly into said channel and outwardly against said inner faces of said legs as the panel edge is moved into said channel;

relief means, undercut in said leg inner faces rearwardly of the point of attachment of said fingers, for receiving said downwardly and outwardly flexing fingers as the panel edge is moved into said channel; and sealing means attached to said base and directed opposite said channel, for forming a dynamic closure seal with an adjacent member.

8. The gasket of claim 7 wherein said first leg is longer than said second leg and said second leg has a bevel along its inner distal edge.

9. The gasket as in claims 7 or 8 wherein said first finger is attached to said first leg inner face adjacent the distal edge of said first leg and said second finger is attached to said second leg inner face spaced from the distal edge of said second leg.

10. A hermetically sealable container door or the like adapted for effecting a dynamic closure seal with an adjacent member, comprising:

a door panel with peripheral edge portion about its perimeter;

a panel edge gasket affixed to said peripheral edge portion, said panel edge gasket including a rigid, resiliently deformable elongated member having a base supporting upstanding, opposed first and second legs defining a panel edge receiving channel, first and second flexible fingers for sealing against opposing panel sidewalls adjacent the panel edge and for resisting removal of the channel from said panel edge, said first and second flexible fingers being respectively attached longitudinally along opposing inner faces of said first and second legs, said fingers further being adapted to flex downwardly into said channel and outwardly against said inner faces of said legs as the panel edge is moved into said channel, and relief means, undercut in said leg inner faces rearwardly of the point of attachment of said fingers, for receiving said downwardly and outwardly flexing fingers as the panel edge is moved into said channel; and sealing means, attached to said base of said panel edge gasket and directed oppositely to said channel, for effecting a dynamic closure seal with the adjacent member.

11. The hermetically sealable container door of claim 1 including an adhesive mastic in said channel permanently affixing the channel to said peripheral edge portion.

* * * * *